US 9,135,285 B1

(12) United States Patent
Johnson et al.

(10) Patent No.: US 9,135,285 B1
(45) Date of Patent: Sep. 15, 2015

(54) LOADING XML RECORDS INTO A DATABASE

(71) Applicants: Carl Eric Johnson, Aubrey, TX (US); William Abernathy, Lewisville, TX (US)

(72) Inventors: Carl Eric Johnson, Aubrey, TX (US); William Abernathy, Lewisville, TX (US)

(73) Assignee: CA, Inc., New York, NY (US)

( * ) Notice: Subject to any disclaimer, the term of this patent is extended or adjusted under 35 U.S.C. 154(b) by 151 days.

(21) Appl. No.: 13/906,073

(22) Filed: May 30, 2013

(51) Int. Cl.
*G06F 17/30* (2006.01)

(52) U.S. Cl.
CPC .................. *G06F 17/30312* (2013.01)

(58) Field of Classification Search
USPC ................ 707/714; 715/500, 513; 709/246
See application file for complete search history.

(56) References Cited

U.S. PATENT DOCUMENTS

| | | | |
|---|---|---|---|
| 7,627,615 B2 * | 12/2009 | McMahon | 1/1 |
| 2004/0172591 A1 * | 9/2004 | Rothschiller et al. | 715/503 |
| 2006/0101320 A1 * | 5/2006 | Dodds et al. | 715/500 |
| 2009/0119415 A1 * | 5/2009 | Chiang et al. | 709/246 |
| 2011/0131200 A1 * | 6/2011 | Zhou et al. | 707/714 |

OTHER PUBLICATIONS

BMC Software, Maximizing DB2 Performance and Availability With BMC, p. 3.
IBM, DB2 9 for z/OS: Using the Utilities Suite, pp. 170-203 (2010).

* cited by examiner

*Primary Examiner* — Etienne Leroux
(74) *Attorney, Agent, or Firm* — Baker Botts L.L.P.

(57) ABSTRACT

A method includes receiving a request to store an extensible markup language (XML) document in a repository. The XML document includes a plurality of markup elements. The method includes extracting a plurality of nodes from the XML document. Each node corresponds to a respective one of the plurality of markup elements, and the plurality of nodes are stored in a same memory block. The method further includes determining a set of memory requirements for each node. Each set of memory requirements includes a first memory space required to store a respective node, a second memory space required to store a set of direct child nodes of the respective node, and a third memory space required to store all descendant nodes of the respective node. The method includes storing each node in respective records in the repository based on each corresponding set of memory requirements for each node.

20 Claims, 3 Drawing Sheets

LOADING XML RECORDS INTO A DATABASE

BACKGROUND

The disclosure relates generally to XML records, and more specifically to loading XML records into a database.

SUMMARY

According to one embodiment of the disclosure, a method includes receiving a request to store an extensible markup language (XML) document in a repository. The XML document comprises a plurality of markup elements. The method also includes extracting a plurality of nodes from the XML document. Each node corresponds to a respective one of the plurality of markup elements, and each of the plurality of nodes are stored in a same memory block. The method further includes determining a set of respective memory requirements for each node. Each set of memory requirements includes a first memory space required to store a respective node. Each set of memory requirements also includes a second memory space required to store a set of direct child nodes of the respective node. Each set of memory requirements further includes a third memory space required to store all descendant nodes of the respective node. The method additionally includes loading the XML document into the repository by storing each node of the plurality of nodes in respective records in the repository based on each corresponding set of memory requirements for each node.

Other features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features, and advantages thereof, reference now is made to the following description taken in connection with the accompanying drawings.

DETAILED DESCRIPTION

Figure 1:
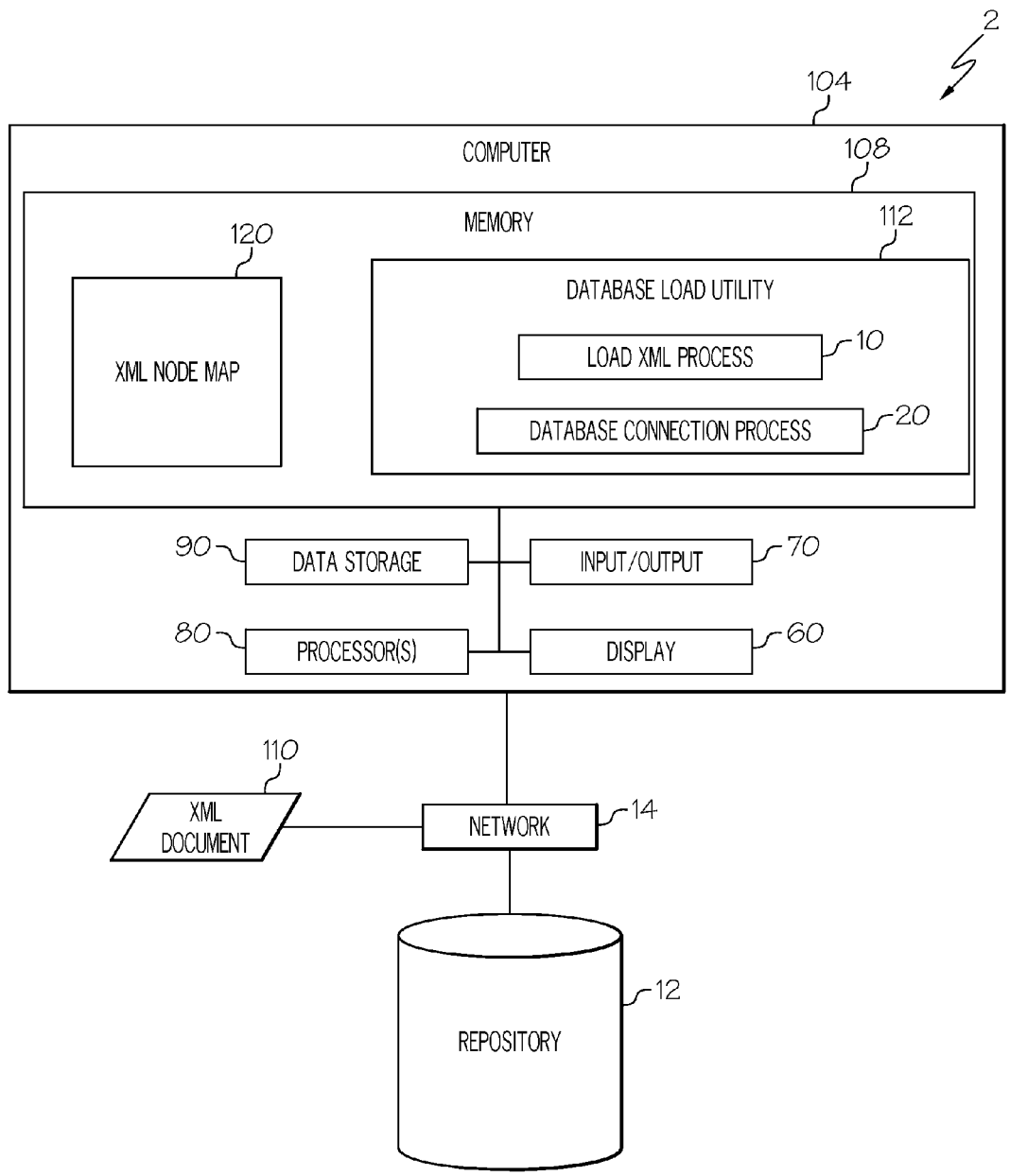
FIG. 1 illustrates a block diagram of a system for loading XML records into a database in accordance with a particular non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADED, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Database administrators (DBA's) use relational database management systems (RDBMS's), such as IBM DB2®, to store vast amounts of diverse business information. In order to speed the process of loading data onto their database platforms, RDBMS vendors provide data loaders that streamline data loading processes. However, these data loaders may store data in an inefficient manner. Since database storage efficiency is tightly coupled to data record query and retrieval speeds, efficient database loading utilities provide the potential to improve data loading speeds, data querying speeds, and data retrieval speeds.

The introduction of the extensible mark-up language (XML) data type in new releases of DB2 created an opportunity to improve the loading process for a complex and new data type. Other DB2 XML data loading utilities may begin writing records before the entire XML document has been parsed. Loading with these processes can lead to inefficient aberrations in the written data records because the length of the XML document and other nodes is not known before each record is written. Due to the tree structure of XML documents, writing data records without planning for the size and depth of the entire XML document can produce inefficient results. In certain embodiments of the present disclosure, a node map is built in 64-bit storage and the entire XML document is parsed prior to writing any records.

With reference to FIG. 1, a system 2 for loading XML records is illustrated in accordance with one particular embodiment. In the illustrated embodiment, system 2 includes a computer 104, a network 14, and a repository 12. Computer 104 includes a processor(s) 80 running a database loading utility 112 in a memory 108. The database load utility 112 receives a request from a user or another process to load an XML document 110 into repository 12. In this example, repository 12 is an IBM DB2®, database. Load XML process 10 of database load utility 112 reads XML document 110 into memory 108 by parsing XML document 110 into a plurality of nodes. Load XML process 10 determines memory requirements for each node that include the memory required to store each node, the memory required to store each node's direct children (i.e., first level descendants), and the memory required to store each node's total descendants (i.e., all levels of descendants). Load XML process 10 creates XML node map 120 that maps each node to respective elements in XML document 110. Database connection process 20 of database load utility 112 connects to repository 12, and load XML process 10 loads XML document 110 into repository 12 based on the memory requirements in XML node map 120 and using database connection process 20.

Nodes from XML node map 120 are accumulated in a first record until the first record is full, or no other nodes are able to be loaded into the first record. For example, once it is determined that a node and its children cannot fit in the record, a proxy node is created, and the node and its children are written to the proxy record. This example may refer to a proxy. As another example, records are filled with some number of whole sibling nodes. For each sibling in the range, if the entire sibling and all its descendants can fit in the current page, then the sibling is added to the current record. However, if the sibling and all its descendants cannot fit in the current page, then the record is written without adding the sibling. This example may refer to a range proxy. When the record is written, the total descendant size of the remaining siblings is considered. If the record is not large enough to fit the descendants of the remaining siblings, processing continues on filling records with whole siblings. Otherwise, the remaining siblings are either added to the record where the range proxy started if there is room, or they are added to yet another record even though they will not fill that record.

In certain embodiments, computer 104 is a mainframe computer. Those of ordinary skill in the art will appreciate that other computing architectures can easily be substituted without departing from the scope of the present disclosure. For example, computer 104 may be a Linux® server, Windows® server, or any other computing platform running any type of operating system.

In certain embodiments, repository 12 is an IBM DB2®, for z/OS database. However, those of ordinary skill in the art will again appreciate the embodiments of the present disclosure to apply to many other relational database management systems (RDBMS's) hosted on a variety of other computing platforms.

In certain embodiments, load XML process 10 loads XML document 110 into memory 108 using z/OS parser tokens. For example, load XML process 10 acquires 64-bit storage and converts XML document 110 into coded character set identifier (CCSID) UTF-8 encoding. When load XML process 10 initially acquires the 64-bit storage, it is requested with a trailing guard area of 3 gigabytes. This trailing guard area reserves the range of addresses from the starting address for 3 gigabytes for this one memory object.

In certain embodiments, as the parser used by load XML process 10 is fed input XML, it produces tokenized output which it places in the memory object. If load XML process 10 parser runs out of space, it returns requesting additional output space. For example, load XML process 10 requests more memory 108 space to finish parsing XML document 110 if the parser requires more space. Additional memory 108 space is acquired for the output memory object, and load XML process 10 parser resumes parsing XML document 110 where it left off.

In other embodiments, each time load XML process 10 parser indicates it needs more output, a break in the parser output appears. Some nodes can span across such breaks. Eventually, the parsing completes, and a memory object contains a single XML document in tokenized format.

In certain embodiments, load XML process 10 examines the tokenized output memory object and creates XML node map 120. XML node map 120 contains chained elements that express the logical relationship of the nodes (e.g., parent-child, child-parent, parent-first sibling, parent-last sibling, and next sibling). Load XML process 10 uses a parent stack to track the current parent. As each new element level is encountered, the address of the current parent is pushed into the parent stack and the new element becomes the current parent. For example, when load XML process 10 examines the tokenized output of a first node's child, the address of the first node is pushed into the parent stack and the child node becomes the current parent. When an end tag is encountered, the parent stack is popped back a level and the previous parent is reinstated as the current parent.

When creating XML node map 120, memory requirements of nodes may be determined. For example, the memory space requirements for a first node are determined. In this process, the memory space requirements of direct child descendants of the first node are determined. Additionally, the memory space requirements of all descendants of the first node are determined. Such information is utilized when filling and writing database records.

In certain embodiments, records are represented in memory 108 as a buffer. Buffers allow, for example, load XML process 10 to work with a local representation of a row in repository 12. Records and buffers are referred to interchangeably in the present disclosure.

In certain embodiments, as each non-element node is processed, the current parent is assigned as that node's parent and the size of the node is added to the total size of the parent node. When the end node is encountered, the total size of the current parent is rolled up to its parent node as part of the total descendant size. Thus, at each node in the map, the size of that node, the size of this node's immediate children, and the size of all this node's descendants is maintained.

In certain embodiments, the size of each namespace context, node ID context, and path context is tracked at each element node. Each element node's context is inherited by its element node children. Such information is used in the pruning process to determine the size and contents of the context section in the XML table record. The node map elements contain the addresses of the related parser tokens in the parsed output. When load XML process 10 has examined the last parser token, it has a complete picture of the document and the size of every sub-tree in XML document 110. For example, this picture is XML node map 120. In other embodiments, the tokenized picture of XML document 110 is an intermediate memory object.

In particular embodiments, if a node's value is split across spanned buffers, continuation elements are chained onto the XML node map 120 element that contains the address of the associated parser token.

XML node map 120 contains XML node map 120 elements that correspond to respective markup elements from XML document 110. The chained set of XML node map 120 elements maps the entire parsed structure of XML document 110. XML node map 120 elements are sub-allocated out of chunks of 64-bit memory (e.g., memory 108) objects. XML node map 120 elements contain fields.

For example, in accordance with one particular embodiment of the present disclosure, XML node map 120 elements contain the following fields:

| Field Name | Format | Description |
| --- | --- | --- |
| NODE | Structure | Node Map Element |
| NODE_QUEUE_NXT@ | 8 byte address | NODE queue forward |
| NODE_QUEUE_PRV@ | 8 byte address | NODE queue backward |
| NODE_TYPE | 1 byte character | Type of node. Same as XDMNODEKIND except for NODE_TYPE_END which is CA'@' or X'40' |
| NODE_ID | 7 byte structure | Node ID |
| NODE_ID_LEN | 1 byte length | Length of local node ID |
| NODE_ID_VALUE | 6 byte binary | Local node ID |
| NODE_NEXT_SIBLING | 8 byte address | Address of next sibling NODE |
| NODE_PARENT@ | 8 byte address | Address of Node parent NODE |
| NODE_CHILD@_FIRST | 8 byte address | Address of Node's 1st child NODE |
| NODE_CHILD@_LAST | 8 byte address | Address of Node's last child NODE |
| NODE_END@ | 8 byte address | Address of Element Node's END node's NODE |
| NODE_PARSE_TOKEN@ | 8 byte address | Address of XML parsed token |
| NODE_ASSOC_TOKEN@ | 8 byte address | Address of associated parse token. In the case of Attribute nodes, there are 2 parse tokens that provide the information to build one DB2 XML record node. This field is used in Attribute nodes to point to the text token containing the attribute value. |
| NODE_BAR@ | 8 byte address | Address of storage area containing the parsed XML token |
| NODE_XMLBUF@ | 8 byte address | Address of associated XML Buffer Element holding the completed DB2 node in the DB2 XML record |
| NODE_XMLOUTLOC@ | 8 byte address | Address of this node in DB2 record output |
| NODE_CONT_CHAIN@ | 8 byte address | Address of first CONT in cont chain. When the XML parser splits a single node across multiple buffers, the parser output will contain multiple tokens for the separate pieces of the node. In this case there will be a NODE for the first token and then one or more |

-continued

| Field Name | Format | Description |
| --- | --- | --- |
| | | CONT elements for each of the subsequent pieces, one for each parser token. |
| NODE_SIZE | 4 byte binary | Size of this node all by itself. |
| NODE_CHILDREN | 4 byte binary | Number of immediate children NODE elements |
| NODE_CHILDSIZE | 8 byte binary | Sum of immediate children's NODE_SIZE |
| NODE_DESCENDSIZE | 8 byte binary | Sum of all descendants NODE_SIZE |
| NODE_BUF_LEFT | 4 byte binary | Remaining buffer space in XML Buffer Element when this node was written. This is for debugging only. |
| NODE_STRINGID | 4 byte binary | String ID of node. This is taken from the associated XML parser token and is used only for debugging. |
| NODE_RECORD# | 4 byte binary | When a given document is written, multiple records may be written to hold the document in the DB2 XML Table. This is the record number that contains this node. |
| NODE_CNTX_NIDLEN | 2 byte binary | Length of context node ID. This is the sum of all NODE_ID_LEN fields if you follow the parent chain up to the document node. That is, this is the amount of space required in the XML record header for the Node ID context if this node happens to be the first node on a new record. |
| NODE_CNTX_NSLEN | 2 byte | Length of context namespace. This is the amount of binary space required in the XML record header for the Namespace context if this node happens to be the first node on a new record. |
| NODE_CNTX_PATHLEN | 2 byte | Length of context path. This is the amount of space binary required in the XML record header for the Path context if this node happens to be the first node on a new record. |
| NODE_LEVEL | 2 byte | Level number within tree. The document node is binary level 1 and it increases by 1 for each element level down the tree. |
| NODE_LEVEL_BOTTOM | 2 byte binary | The lowest element level below this element. When a given node will not fit in the current record and it is too large to fit on a record by itself, the level number of the bottom node is subtracted from the level number of the current node to determine how many levels lie below the current node, if only one level remains, the node is proxied out, otherwise it is range proxied out. |
| NODE_FLAG | 1 byte binary | Information flags. These are primarily for debugging purposes. They indicate the status of the given node. |
| NODE_FLAG_NAMESP | X'80' | This element owns Namespace definitions. |
| NODE_FLAG_NOESC | X'40' | This text does not contain data that must be "escaped" when serialized. |
| NODE_FLAG_CONT | X'10' | The DB2 node was too big to fit in a single record so continuation nodes were required to write it. |
| NODE_FLAG_PROXY | X'08' | A proxy node was used move this node to another record. |
| NODE_FLAG_RANGE | X'04' | This node's children (a set of siblings) were sent to another record via a range proxy. |
| NODE_FLAG_LEAF | X'02' | This is an element leaf node. That is, it contains data. As opposed to an element node that contained only other element nodes. |
| NODE_FLAG_WRITTEN | X'01' | This node has been placed in a record to be written. |
| NODE_FLAG2 | 1 byte binary | More information flags: |
| NODE_FLAG2_KEY | X'80' | A real (primary) key was written for this node. |
| NODE_FLAG2_VIRTKEY | X'40' | A virtual (secondary) key was written for this node. |

In accordance with different embodiments, XML node map 120 elements may include more, less, or other fields depending on the characteristics of the implementation. Load XML process 10 fills in the fields for each XML node map 120 element it creates.

In certain embodiments, XML node map 120 elements include continuation elements. XML node map 120 continuation elements (CONT elements) are sub-allocated out of a 64-bit memory objects. Continuation elements are used when load XML process 10 parser (e.g., the z/OS XML parser) splits a single node across multiple buffers. When this occurs, the NODE element will contain the address of the first part of the node that was split. Following the above example, the NODE_CONT_CHAIN@ field will point to the first or only CONT element. In turn, this CONT element will point to the load XML process 10 parser token that contains the continued node. Only attribute, text, comment, and processing instruction (PI) nodes fall into this category.

Another example where CONT elements are used is where XML document 110 contains a CDATA markup element with plain text content. In this example, the parsed output contains a sequence of two or more text tokens with the CDATA being presented as a text token but bracketed by a "Start CDATA" tag before and an "End CDATA" tag after. In this example, the second and following text tokens are linked back to the first text token via CONT elements. The resulting DB2 record node will be rendered as a concatenation of the text values. Text tokens that contain CDATA will never have the NODE_FLAG_NOESC flag set.

Consistent with the teachings of the present disclosure, any number of records may be required to store a single text, CDATA, or PI node.

If any parsed tokens from XML node map 120 have the NODE_FLAG_NOESC flag off, the corresponding node in the DB2 record that load XML process 10 creates will have the NODE_FLAG_NOESC flag off.

The below table illustrates an example portion of the fields from XML node map 120 element that specify a CONT element in accordance with the above example:

| Field Name | Format | Description |
| --- | --- | --- |
| CONT | Structure | Continuation Element |
| CONT_NEXT@ | 8 byte address | Address of the next CONT element for this NODE or zero |
| CONT_PARSE_TOKEN@ | 8 byte address | Address of XML parsed token |

In certain embodiments, rules are followed for building the DB2 XML table records. The below example presents example steps for implementing XML table record creation rules:
1. In some embodiments, the root document record is loaded such that it may not be filled up. Sub-trees of nodes can be sent off to another record using:
    a. Proxy nodes—A single node is replaced by a proxy node and the actual node is placed in another record. This node may own children.
    b. Range Proxy nodes—A set of sibling nodes that are written to a sequence of records. The Range Proxy contains the node ID of the first in the range and the last node ID in the range. The record must be located via the Node ID Index.
2. A single large node can be continued on another record by setting the continue flag in that node and then using continuation nodes in other records.
3. A certain amount of space is reserved in each record to handle the possibility of inserting a sub-tree into the record. That is, the record is never filled to capacity in a LOAD operation.
4. The XML tree level of the first node recorded on a given record sets the limit for other nodes recorded in the same record. For example, if the XML tree level of the first node on the record is 5, then only nodes with XML tree levels of 5 or greater can be recorded in this record. Encountering a node whose level is 4 or less indicates the current record is complete, even if it is nowhere near full.

In certain embodiments, load XML process 10 conducts a pruning process. The pruning process operates by processing XML node map 120 sequentially. The remaining amount of XML node map 120 is tracked at all times by load XML process 10. In this example, load XML process 10 uses a stack data structure to reflect the current state of processing and record buffers.

According to one embodiment of the present disclosure, load XML process 10 pruning process executes in one of three modes: root mode, proxy mode, and range proxy mode. A description of each of these three example modes follows below.

For example, load XML process 10 is in root mode when it is working on loading the document root record. Load XML process 10 includes certain program instructions to prevent the root record from filling up. By examining the total amount of document remaining, it decides whether a given sub-tree will be added to the root or if a proxy or range proxy node will be generated to replace it.

In certain embodiments, proxies and/or range proxies start on non-root records. For example, a set of nodes are part of a range proxy to a second record. If the sibling node is too large to fit on the second record by itself, then the next level down is considered. If it is a single node, it is proxied to another record, otherwise the children of this sibling node are range proxied out to another record and the final range of that lower level's siblings may end up being stored adjacent to their parent, the original sibling that did not fit.

In certain embodiments, load XML process 10 generates index records for proxy points and range proxy points in the document records. Index records may facilitate faster retrieval and traversal of data records stored by load XML process 10.

As another example, load XML process 10 enters proxy mode when it is working on a node that has been sent to another record via a proxy node. The previous level of work has been pushed into the stack and a new stack level has been established to handle the node that was proxied out. The size of the node and any children it owns is placed in the stack entry. This value is decremented as it writes nodes to the new record until the value reaches zero. At that point the proxy is complete. The record can be written. The stack is popped back to the previous level where work will resume on the previous record. In the process of building the proxy, it may be necessary to employ proxy and range proxy nodes to move nodes off onto other records. If that is required, the stack is pushed again.

As still another example, load XML process 10 enters range proxy mode when it is working on writing out ranges of sibling nodes. The previous level of work has been pushed into the stack and a new stack level has been established to handle the sibling nodes that are range proxied out. As each sibling is encountered, the size of the sibling and all its descendants is considered. If the sibling will fit in the current record, then is it added and the next sibling is then considered. When a record has been filled (i.e., that is, a sibling and its descendants will not fit), load XML process 10 checks to see if the remaining ranges will fit on the record one back in the stack (i.e., the record containing the range proxy node). If it will not fit, another new record is started at the same stack level and the siblings continue to be processed. If it will fit, then if the previous level is the root, if the remaining bytes in the document will fit, then the final ranges are written to the root record, otherwise, another new record is started at the same stack level and the final ranges are written to it.

With respect to the above range proxy example, if any given sibling in the range is too large to fit in a record, then that one sibling is further pruned down by employing either a proxy to a continuation node sequence, or it is range proxied to yet another set of records. Either way, this represents another push into the stack; That sibling is processed until it is completed and then the stack is popped back and the range proxy processing continues with the next sibling.

In certain embodiments, load XML process 10 creates XML buffer elements (XMLBUF). These elements are sub-allocated out of 64-bit memory objects and are allocated on, for example, 16 k boundaries. XML buffer elements contain the XML record being built and the fields used to control the building of the record. The XMLBUF_Next@ field in the below example points to the next free XMLBUF in the free chain. Once it is pulled from the free chain, the XMLBUF_Next@ field is zeroed out. At that time, the active XMLBUF elements are tracked in STK entries. The records are constructed one node at a time until they are complete.

In this example, as proxy and range proxy elements are generated, virtual (i.e., secondary) keys are added to the XMLBUF_KeyElm@ field queue (i.e., key element). Once this is completed, load XML process 10 writes the XML record and the associated keys. The key elements and the XML buffer element itself are returned to the free chains in last in first out order.

The following table represents an example XML buffer element structure:

| Field Name | Format | Description |
| --- | --- | --- |
| XMLBUF | Structure | XML Buffer Element |
| XMLBUF_Next@ | 8 byte address | Address of next XMLBUF element |
| XMLBUF_Start@ | 8 byte address | Address of the beginning of the record buffer (XMLBUF_Buffer) |
| XMLBUF_Current@ | 8 byte address | Current location in buffer. As nodes are added to the record, this points to the next available location in the buffer. |
| XMLBUF_Last_NODE@ | 8 byte address | Address of last node processed in this buffer. |
| XMLBUF_XML_Hdr@ | 8 byte address | Address of XML header node in this record. |
| XMLBUF_KeyElm@ | 8 byte address | Anchor for LIFO key element chain. One or more keys are associated with this record. This points to the first or only KEYELM. |
| XMLBUF_Rec# | 4 byte binary | Logical record number in document. This is primarily for debugging. It indicates the order the XMLBUF elements were allocated. |
| XMLBUF_Seq# | 4 byte binary | Write sequence number. This is primarily for debugging. It indicates the order in which the records were written. |
| XMLBUF_BytesLeft | 2 byte binary | Bytes remaining in XML column. This is used to determine when the record is as full as it can be. |
| XMLBUF_XML_Level | 2 byte binary | XML level owned by record. The XML tree level of the first node in this record sets the minimum level of node that can be recorded in this record. For example, if the first node record is level 5, any nodes with a level of 5 or greater can be recorded in this record. |
| XMLBUF_Flag | 1 byte binary | Control flags |
| XMLBUF_Flag_Used | B'10000000' | User data in buffer that must be written. That is, the physical write has not yet occurred. |
| XMLBUF_Flag_Doc | B'01000000' | Document node is present. This record is the root record. |
| XMLBUF_Flag_Nodes | B'00100000' | Nodes have been added |
| XMLBUF_Buffer | Up to 16007 | XML table record without the 6 byte row header. That is, for multi-version format, the Doc ID column, beginning timestamp column, ending timestamp column, Node ID column, and XML data column. | ment 110 where, if you wanted to logically follow the next node in sequence, you would need to go to another record. XMLBUF_KeyElm@ points to the first or only KEYELM element. KEYELM_Next@ points to the next key if it is in the XMLBUF_KeyElm@ queue or it points to the next free KEYELM in the free queue.

The following table represents an example key element structure:

| Field Name | Format | Description |
| --- | --- | --- |
| KEYELM | Structure | Key Element |
| KEYELM_Next@ | 8 byte address | Address of the next KEYELM in the key chain or the next free KEYELM in the free chain. |
| KEYELM_Key | Structure | The XML key as it will be recorded in the Node ID Index. |
| KEYELM_KeyLen | 2 byte binary | The length of this key. |
| KEYELM_Key_Data | Up to 246 bytes | The Node ID Index key |

In certain embodiments, load XML process 10 creates key elements. Key elements are sub-allocated out of 64-bit memory objects on, for example, 256 byte boundaries. Real (i.e., primary) keys are generated for the highest key in a given XML record. Virtual (secondary) keys are generated for a given record at points where proxy or range proxy nodes are placed. Virtual keys indicate the highest key possible up to the point where the proxy or range proxy node is placed. The proxy and range proxy nodes represent points in XML docu- In certain embodiments, load XML process 10 uses a stack in the pruning process. The stack (STK) is sub-allocated in 31-bit storage as part of XML process 10 working storage.

The pruning process uses the stack to manage proxy and range proxy processing. When the need for a proxy or range proxy comes up, the pruning process pushes the current XMLBUF into the stack, acquires a new XMLBUF and works on the proxy or range proxy until it is complete. If the need for another proxy or range proxy is encountered, then the stack is pushed again. Once the proxy or range proxy is complete, the pruning process then pops the stack and resumes work on the unstacked entry.

Using the stack to control the pruning process may result in the root record being written last. In this implementation, records are written as they are filled or when the stack must be popped leaving the root record as the last record to be managed in the first stack entry. Thus, when the last node has been processed the stack can be emptied, which triggers the writing of the root record.

In other embodiments, records may be held in memory (e.g., as buffers or other objects) until all the records have been constructed. The database is then written to after construction of the root record in memory. In these embodiments, the root record may be stored in the database first.

| Field Name | Format | Description |
|---|---|---|
| STK | Structure | Stack |
| STK_RNGPXY@ | 8 byte address | Address of range proxy element |
| STK_PREVLAST@ | 8 byte address | Address of last in previous range |
| STK_ENDRNG@ | 8 byte address | Node address of end of current range for range proxy mode |
| STK_LASTNODE@ | 8 byte address | Node address of END node for parent for range proxy mode |
| STK_XMLBUF@ | 8 byte address | Address of current XMLBUF |
| STK_DOC_LEFT | 8 byte binary | Document bytes left before push. The total document bytes remaining is tracked at all times. When a stack operation occurs, the current value of that counter is stored here. Then the stack is pushed and a proxy or range proxy operation takes place at the next level. The sum of those bytes is actually part of the STK_RNG_LEFT value in the stack entry that got pushed. When the stack gets popped to resume work on the previous stack entry, the then current total document byes left is subtracted from this value. That gives the total number of bytes of this stack entry that got proxied out of the entry. That value is then subtracted from STK_RNG_LEFT so that it correctly reflects the number of bytes left to process for this stack entry. |
| STK_RNG_LEFT | 8 byte binary | Number of bytes left in range when the pruning process begins a new range in a range proxy. The total size of that range is stored here. As the nodes are processed, their length is subtracted. When this value reaches zero, the range is complete. It is also used for proxy nodes. The total size of the node to be proxied including all of it descendants is stored here and the same process is used to determine when the proxy is complete. |
| STK_LASTNID | 7 byte binary | Last Node ID of sibling level node range for range proxy node |
| STK_REC# | 4 byte binary | Current record number associated with the current XMLBUF |
| STK_LEVEL | 2 byte binary | XML lowest level number for the current XMLBUF |
| STK_MODE | 1 byte binary | Mode indicator |
| STK_MODE_ROOT | 0 | Root mode |
| STK_MODE_PXY | 4 | Proxy mode |
| STK_MODE_RNG | 8 | Range proxy mode |
| STK_FLG | 1 byte binary | Control flag |
| STK_FLG_LVL | B'10000000' | Tree level of stack level set |
| STK_FLG_LAST | B'01000000' | Processing last range. The next sibling pointer of this range was zero, thus the end of the final range occurs when node whose address is in STK_ENDRNG@ is processed. |
| STK_FLG_WRAP | B'00100000' | Wrapping up last range of the range proxy in the record adjacent to the range proxy node itself. The pruning process is adding the final set of ranges, referred to as the "tail". If the tail is being written back in the record adjacent to the range proxy, this flag is set. The stack is not popped. Instead, it copies the XMLBUF address from the previous stack entry and concludes the tail there. In this case, popping the stack back to the previous entry does not trigger writing the record yet. It will be written when the previous stack entry is popped. If the logic decides to write the tail in a record by itself, the process acquires a new XMLBUF and concludes the tail. In this case popping the stack would trigger the write of the record. |

Figure 2:
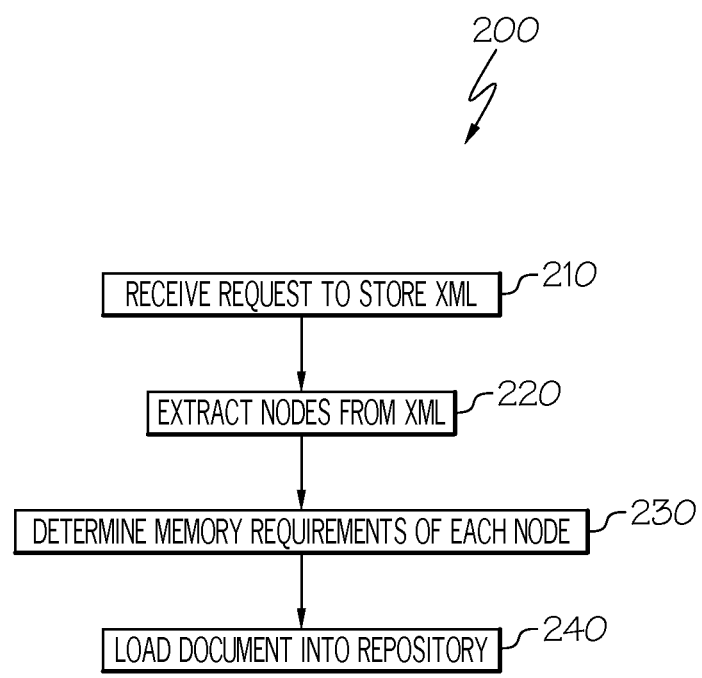
FIG. 2 illustrates a flowchart of a method for loading XML records into a database in accordance with another embodiment of the present disclosure.

Referring to FIG. 2, a flowchart describing a method 200 for loading XML records into a database is illustrated in accordance with a particular embodiment of the present disclosure. At 210, database load utility 112 receives a request to store XML document 110 in repository 12. XML document 110, for example, includes markup elements and content.

As an example, database load utility 112 runs as a utility program. As another example, database load utility 112 is a process running on a mainframe system, with a local DB2 database. A user or triggering process sends database load utility 112 a request to store XML document 110 in the local DB2 database. In certain embodiments, the user uses input/output 70 and display 60 to request XML document 110 be loaded in the database. In still other embodiments, another utility program, process, or thread initiates the request.

At 220, load XML process 10 extracts nodes from XML document 110. The extracted nodes correspond to respective markup elements from XML document 110. Each of the extracted nodes are stored in a memory object such that each of the extracted nodes reside in memory at the same time. For example, load XML process 10 extracts nodes into memory 108.

At 230, memory requirements of each node are determined. In one embodiment, the memory requirements include the memory space required to store a respective node, a memory space required to store a set of direct child nodes of the respective node, and a memory space required to store all descendant nodes of the respective node. This information is kept in XML node map 120.

In certain embodiments, the memory requirements of descendant nodes are rolled into the memory requirements of each parent node.

At 240, load XML process 10 creates XML records to be written to repository 12 by adding each node to respective records in memory 112. The record construction is based on each corresponding set of memory requirements for each node. In certain embodiments, XML document 110 is loaded into repository 12 based on the memory requirements in XML node map 120. For example, database connection process 20 connects to repository 12 via network 14 and loads XML document 110 into repository 12 based on XML node map 120. In certain embodiments, XML document 110 is loaded into repository 12 one record at a time.

In certain embodiments, load XML process 10 ensures that records are filled to the greatest extent possible before storing nodes in another record by using the size of the node's immediate descendants (i.e., first generation child nodes). For example, when the size of all descendants of a particular node will not fit in the current record and the current record is not the root record, then if the node's second memory space will fit in the current record that node is added to the current record. This results in, during processing of this node's children, one or more of the children getting either proxied out or range proxied out.

Figure 3:
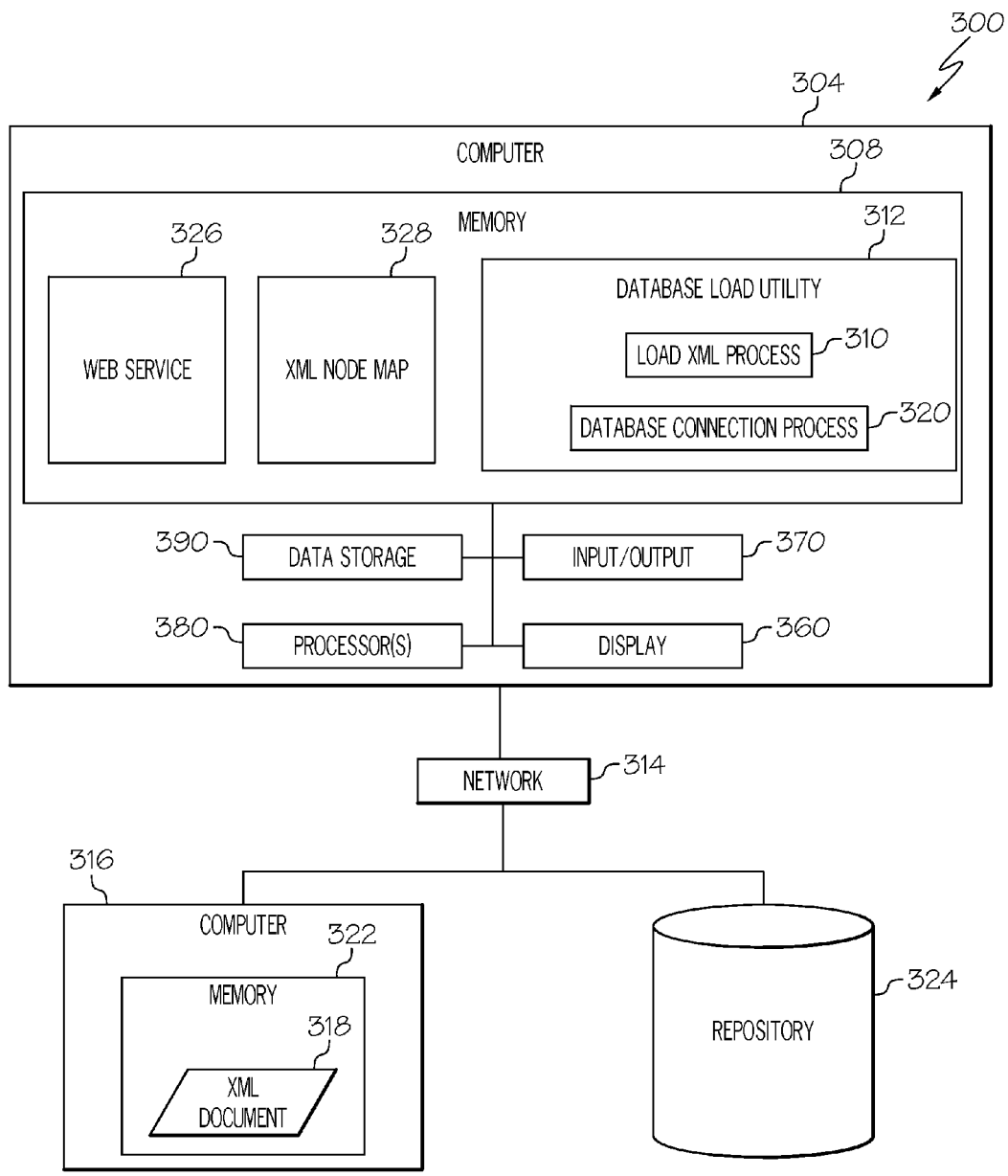
FIG. 3 illustrates a block diagram of a system for loading XML records into a database in accordance with another non-limiting embodiment of the present disclosure.

Referring to FIG. 3, a system 300 for loading XML records into a database is illustrated in accordance with still another non-limiting embodiment. In FIG. 3, a computer 316 with memory 322 hosts an XML document 318 on a remote computer connected via network 314 to a computer 304 running a database load utility 312. For example, a user of computer 316 initiates a request on computer 304 via network 314 to store XML document 318 in a repository 324, also connected via network 314.

The request in this embodiment is initiated via a web service 326 running in memory 308 of computer 304. For example, web service 326 receives the request from computer 316 and calls database load utility 312. Load XML process 310 then retrieves XML document 318 from computer 316 and begins extracting nodes into memory 308, in accordance with the above defined processes.

Those of ordinary skill in the art will appreciate a multitude of configurations and placements of each system component. The embodiments described in the figures are merely illustrative in purpose and should not limit the configuration of components to those described here.

In still other embodiments, building a node map of the XML document 110 provides the total size of the document, the number and size of a given node's immediate children, the number and size of a given node's total descendants, and the total length of each node. This allows for the most efficient storage of the document within DB2 XML table space records.

In other embodiments, analysis of the output of a z/OS XML parser token provides a completely parsed XML document. For example, a Mainframe computer contains an XML parsing process that parses the XML document into tokens. Analysis of the XML document tokens enables building a complete XML node map that describes the space requirements for each node and sub-tree within the XML document.

In certain embodiments, the node map is processed sequentially. At each sequential pass of each node, a choice is made between recording the node in the current table record, or pushing it out into its own table record or set of table records.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving a request to store an extensible markup language (XML) document in a repository, wherein the XML document comprises a plurality of markup elements;
   extracting a plurality of nodes from the XML document, wherein each node corresponds to a respective one of the plurality of markup elements;
   determining a set of respective memory requirements for each node, each set of memory requirements comprising:
      a first memory space required to store a respective node;
      a second memory space required to store a set of direct child nodes of the respective node; and
      a third memory space required to store all descendant nodes of the respective node; and
   loading the XML document into the repository, comprising:
      loading a first node into a first record;
      determining whether the memory space of the first record is sufficient to store a second node and descendant nodes of the second node based on the corresponding set of memory requirements of the second node;
      in response to determining that the memory space of the first record is not sufficient to store the second node and the descendant nodes of the second node, loading the second node into a second record.

2. The method of claim 1, wherein loading the XML document further comprises:
   determining first particular nodes of the plurality of nodes to store in the first record; and
   determining second particular nodes of the plurality of nodes to store in a proxy record based on the corresponding third memory space of each node; and
   storing an identifier indicative of the proxy record in the first record.

3. The method of claim 1, wherein the identifier comprises a first identifier and the proxy record comprises a set of range proxy records, and wherein loading the XML document further comprises:
   storing a first identifier indicative of the first range proxy record in the set of range proxy records and a last identifier indicative of the last range proxy record in the set of range proxy records in the first record.

4. The method of claim 1, further comprising:
   determining a span node from the plurality of nodes based on the corresponding first memory space of each node; and
   splitting the span node to reference a first record and a second record in the repository.

5. The method of claim 1, wherein the repository is a DB2 database, and the respective records are DB2 XML records.

6. The method of claim 1, wherein the extracting the plurality of nodes from the XML document is completed using a z/OS XML parser.

7. The method of claim 1, further comprising:
   in response to determining that the memory space of the first record is sufficient to store the second node and the descendent nodes of the second node, loading the second node into the first record.

8. A computer configured to access a storage device, the computer comprising:
   a processor; and
   a non-transitory, computer-readable storage medium storing computer-readable instructions that when executed by the processor cause the computer to perform:
      receiving a request to store an extensible markup language (XML) document in a repository, wherein the XML document comprises a plurality of markup elements;
      extracting a plurality of nodes from the XML document, wherein each node corresponds to a respective one of the plurality of markup elements;
      determining a set of respective memory requirements for each node, each set of memory requirements comprising:
         a first memory space required to store a respective node;
         a second memory space required to store a set of direct child nodes of the respective node; and
         a third memory space required to store all descendant nodes of the respective node; and
      loading the XML document into the repository, comprising:
         loading a first node into a first record;
         determining whether the memory space of the first record is sufficient to store a second node and descendant nodes of the second node based on the corresponding set of memory requirements of the second node;
         in response to determining that the memory space of the first record is not sufficient to store the second node and the descendant nodes of the second node, loading the second node into a second record.

9. The computer of claim 8, wherein loading the XML document further comprises:
   determining first particular nodes of the plurality of nodes to store in the first record;
   determining second particular nodes of the plurality of nodes to store in a proxy record based on the corresponding third memory space of each node; and
   storing an identifier indicative of the proxy record in the first record.

10. The computer of claim 8, wherein the identifier comprises a first identifier and the proxy record comprises a set of range proxy records, and wherein loading the XML document further comprises:
    storing a first identifier indicative of the first range proxy record in the set of range proxy records and a last identifier indicative of the last range proxy record in the set of range proxy records in the first record.

11. The computer of claim 8, wherein loading the XML document further comprises:
    determining a span node from the plurality of nodes based on the corresponding first memory space of each node; and
    splitting the span node to reference a first record and a second record in the repository.

12. The computer of claim 8, wherein the repository is a DB2 database, and the respective records are DB2 XML records.

13. The computer of claim 8, wherein the extracting the plurality of nodes from the XML document is completed using a z/OS XML parser.

14. The computer of claim 8, wherein loading the XML document further comprises:
in response to determining that the memory space of the first record is sufficient to store the second node and the descendent nodes of the second node, loading the second node into the first record.

15. A computer program product comprising:
a computer-readable storage medium having computer-readable program code embodied therewith, the computer-readable program code comprising:
computer-readable program code configured to receive a request to store an extensible markup language (XML) document in a repository, wherein the XML document comprises a plurality of markup elements;
computer-readable program code configured to extract a plurality of nodes from the XML document, wherein each node corresponds to a respective one of the plurality of markup elements;
computer-readable program code configured to determine a set of respective memory requirements for each node, each set of memory requirements comprising:
a first memory space required to store a respective node;
a second memory space required to store a set of direct child nodes of the respective node; and
a third memory space required to store all descendant nodes of the respective node; and
computer-readable program code configured to:
load a first node into a first record;
determine whether the memory space of the first record is sufficient to store a second node and descendant nodes of the second node based on the corresponding set of memory requirements of the second node;
in response to determining that the memory space of the first record is not sufficient to store the second node and the descendant nodes of the second node, load the second node into a second record.

16. The computer program product of claim 15, further comprising computer-readable program code configured to:
determine first particular nodes of the plurality of nodes to store in the first record;
determine second particular nodes of the plurality of nodes to store in a proxy record based on the corresponding third memory space of each node; and
store an identifier indicative of the proxy record in the first record.

17. The computer program product of claim 15, the identifier comprises a first identifier and the proxy record comprises a set of range proxy records, and further comprising computer-readable program code configured to:
store a first identifier indicative of the first range proxy record in the set of range proxy records and a last identifier indicative of the last range proxy record in the set of range proxy records in the first record.

18. The computer program product of claim 15, further comprising computer-readable program code configured to:
determine a span node from the plurality of nodes based on the corresponding first memory space of each node; and
split the span node to reference a first record and a second record in the repository.

19. The computer program product of claim 15, wherein the repository is hosted on a mainframe.

20. The computer of claim 15, further comprising computer-readable program code configured to:
in response to determining that the memory space of the first record is sufficient to store the second node and the descendent nodes of the second node, load the second node into the first record.

* * * * *